United States Patent
Zhou et al.

(10) Patent No.: US 12,147,137 B2
(45) Date of Patent: Nov. 19, 2024

(54) ARRAY SUBSTRATE AND DISPLAY PANEL

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Maoxiu Zhou, Beijing (CN); Yanping Liao, Beijing (CN); Yingmeng Miao, Beijing (CN); Yuntian Zhang, Beijing (CN); Lei Guo, Beijing (CN); Ke Dai, Beijing (CN); Haipeng Yang, Beijing (CN); Zhihua Sun, Beijing (CN); Xibin Shao, Beijing (CN); Zhangtao Wang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/380,203

(22) Filed: Oct. 16, 2023

(65) Prior Publication Data
US 2024/0036420 A1 Feb. 1, 2024

Related U.S. Application Data

(63) Continuation of application No. 17/312,427, filed as application No. PCT/CN2020/113807 on Sep. 7, 2020, now Pat. No. 11,829,041.

(51) Int. Cl.
*G02F 1/1362* (2006.01)
*G02F 1/1368* (2006.01)

(52) U.S. Cl.
CPC .. *G02F 1/136286* (2013.01); *G02F 1/136227* (2013.01); *G02F 1/1368* (2013.01)

(58) Field of Classification Search
CPC .................................................. G02F 1/1362
See application file for complete search history.

(56) References Cited

U.S. PATENT DOCUMENTS 7,292,302 B2  11/2007  Min et al.
7,859,628 B2  12/2010  Park et al.
(Continued)

FOREIGN PATENT DOCUMENTS

CN         1637558 A      7/2005
CN     101527306 A      9/2009
(Continued)

OTHER PUBLICATIONS

Written Opinion from PCT/CN2020/113807 dated May 26, 2021.
(Continued)

*Primary Examiner* — Sang V Nguyen
(74) *Attorney, Agent, or Firm* — XSENSUS LLP

(57) ABSTRACT

An array substrate includes a base substrate, pixel electrodes and common electrodes, first scan lines, second scan lines and data lines. The pixel electrode has first electrode strips disposed at intervals in a row direction. The common electrodes and the pixel electrodes are disposed on the same layer, and the common electrodes have second electrode strips disposed at intervals. The second electrode strips and the first electrode strips are alternatively arranged. The first scan line is located between two adjacent rows of pixel electrodes. The second scan line is located between two adjacent columns of pixel electrodes and is electrically connected to the first scan line, and the second scan line has a scan signal input terminal. The data line has a data signal input terminal. An orthographic projection of the data line on (Continued)

the base substrate intersects with a central region of the pixel electrode on the base substrate.

20 Claims, 17 Drawing Sheets

(56) References Cited

U.S. PATENT DOCUMENTS

| | | | |
|---|---|---|---|
| 7,923,734 B2 | 4/2011 | Xue | |
| 8,098,342 B2* | 1/2012 | Lee | G02F 1/13624 349/39 |
| 2002/0063835 A1* | 5/2002 | Kim | G02F 1/134363 349/141 |
| 2003/0098939 A1 | 5/2003 | Min et al. | |
| 2003/0133066 A1* | 7/2003 | Ono | G02F 1/134363 349/141 |
| 2005/0140903 A1 | 6/2005 | Park et al. | |
| 2008/0212008 A1* | 9/2008 | Kim | G02F 1/1368 349/139 |
| 2009/0256158 A1 | 10/2009 | Xue | |
| 2010/0244025 A1* | 9/2010 | Liou | H01L 27/1255 257/98 |
| 2012/0105758 A1* | 5/2012 | Qin | G02F 1/1309 445/24 |
| 2014/0375922 A1* | 12/2014 | Park | G02F 1/136286 349/46 |
| 2016/0147123 A1* | 5/2016 | Cheng | G02F 1/13439 257/72 |
| 2016/0187746 A1* | 6/2016 | Yue | G02F 1/1337 349/123 |
| 2017/0115801 A1* | 4/2017 | Shih | G06F 3/0412 |
| 2017/0343860 A1 | 11/2017 | Park et al. | |
| 2018/0188567 A1* | 7/2018 | Jiang | G02F 1/136286 |

FOREIGN PATENT DOCUMENTS

| | | | |
|---|---|---|---|
| CN | 101561594 A | 10/2009 | |
| CN | 101527306 B | 1/2011 | |
| CN | 103680326 * | 3/2014 | G02F 1/1333 |
| CN | 103680326 A | 3/2014 | |
| CN | 105047088 A | 11/2015 | |
| CN | 105652547 A | 6/2016 | |
| CN | 103680326 B | 10/2016 | |
| CN | 109119028 A | 1/2019 | |
| CN | 110825261 A | 2/2020 | |
| KR | 20010004913 A | 1/2001 | |

OTHER PUBLICATIONS

Search results dated Jun. 3, 2020.

Non-Final Office Action mailed Apr. 3, 2023, for U.S. Appl. No. 17/312,427, filed Jun. 10, 2021, 19 pages.

Notice of Allowance mailed Jul. 17, 2023, for U.S. Appl. No. 17/312,427, filed Jun. 10, 2021, 8 pages.

* cited by examiner

ARRAY SUBSTRATE AND DISPLAY PANEL

CROSS-REFERENCE TO RELATED APPLICATIONS

The present application is a continuation of U.S. patent application Ser. No. 17/312,427, filed on Jun. 10, 2021, which is a 371 application of PCT Application No. PCT/CN2020/113807, filed on Sep. 7, 2020, the entire contents of both of which are hereby incorporated by reference.

TECHNICAL FIELD

The present disclosure relates to display technology, and more particularly, to an array substrate and a display panel.

BACKGROUND

With the application and popularization of the concept of full-screen in small and medium-sized display products, large-sized display products (e.g. TVs) are pursuing extremely fashion appearance. The TV market has moved to a "bezel-less" era and full-screen has become a new developing direction of the TV market. However, at present, large-sized full-screen display products have picture quality problem such as Mura (uneven brightness).

It should be noted that information in the background technology are provided only for acquiring better understanding of the background of the disclosure and therefore may include information that is not exist technology already known to those of ordinary skill in the art.

SUMMARY

It is an objective of the present disclosure to provide an array substrate and a display panel that is capable of reducing the picture quality problem such as Mura existing in the products and improve product quality.

A first aspect of the present disclosure provides an array substrate, wherein the array substrate includes:
  a base substrate;
  a plurality of pixel electrodes, arranged in a form of array on the base substrate in a row direction and a column direction, wherein each of the pixel electrodes has a plurality of first electrode strips disposed at intervals in the row direction;
  a plurality of common electrodes, disposed on a same layer as the pixel electrodes, wherein each of the common electrodes has a plurality of second electrode strips disposed at intervals in the row direction, and the second electrode strips and the first electrode strips are alternatively arranged in the row direction;
  a plurality of rows of first scan lines, formed between the base substrate and the pixel electrodes, wherein each row of the first scan lines is located between two adjacent rows of the pixel electrodes;
  a plurality of columns of second scan lines, formed between the base substrate and the pixel electrodes, wherein each column of the second scan lines is located between two adjacent columns of the pixel electrodes and is electrically connected to the corresponding first scan line through a via hole structure, and the second scan line has a scan signal input terminal; and
  a plurality of columns of data lines, formed between the base substrate and the pixel electrodes, wherein each of the data lines has a data signal input terminal, and two sides of the data line in the row direction are located within both sides of one of the pixel electrodes in the row direction.

In an exemplary embodiment of the present disclosure, distances from the two sides of the data line in the row direction to a center of the pixel electrode in the row direction are equal to each other.

In an exemplary embodiment of the present disclosure, the two sides of the data line in the row direction are located on within both sides of one of the second electrode strips in the row direction.

In an exemplary embodiment of the present disclosure, the data lines and the second scan lines are provided on a same layer.

In an exemplary embodiment of the present disclosure, a number of the common electrodes is less than a number of the pixel electrodes in each row.

In an exemplary embodiment of the present disclosure, both sides of the second scan line in the row direction are located within two sides of one of the second electrode strips in the row direction.

In an exemplary embodiment of the present disclosure, the array substrate further includes:
  a plurality of rows of first common signal lines, wherein the first common signal lines and the first scan lines are disposed on a same layer, and each of the first common signal lines is located between two adjacent rows of the pixel electrodes,
  wherein one row of the first common signal lines and one row of the first scan lines are disposed between every two adjacent rows of the pixel electrodes, and each of the first common signal line is electrically connected to the corresponding common electrode through a via hole structure.

In an exemplary embodiment of the present disclosure, the array substrate further includes:
  one or more columns of second common signal lines, wherein the second common signal lines and the second scan lines are disposed on a same layer, each column of the second common signal lines is located between two adjacent columns of the pixel electrodes and is electrically connected to each row of the first common signal lines through a via hole structure, and both sides of the second common signal line in the row direction are located within both sides of one of the second electrode strips in the row direction,
  wherein the second common signal line has a common signal input terminal.

In an exemplary embodiment of the present disclosure, a column of the second scan lines is provided between two adjacent columns of the pixel electrodes of one portion of the pixel electrodes, and a column of the second common signal lines is provided between two adjacent columns of the pixel electrodes of another portion of the pixel electrodes.

In an exemplary embodiment of the present disclosure, the array substrate further includes first metal lines and second metal lines disposed on a same layer as the first scan lines, wherein the first metal lines and the second metal lines are disconnected from the first scan lines, respectively,
  wherein orthographic projections of the first metal line and the second metal line on the base substrate are located within an orthographic projection of one of the second electrode strips on the base substrate, and are located on both sides of the corresponding second scan line in the row direction respectively, or located on both sides of the corresponding second common signal line in the row direction respectively.

In an exemplary embodiment of the present disclosure, the second electrode strip of the common electrode corresponding to the data line, the second scan line or the second common signal line has a size in the row direction larger than that of the other second electrode strips in the row direction.

In an exemplary embodiment of the present disclosure, the scan signal input terminal of the second scan line, the common signal input terminal of the second common signal line and the data signal input terminal of the data line are located on a same side of the base substrate.

In an exemplary embodiment of the present disclosure, each row of the first scan lines is electrically connected to two or more columns of the second scan lines.

In an exemplary embodiment of the present disclosure, the array substrate further includes: a plurality of drive transistors, arranged in a form of array on the base substrate in the row direction and the column direction, wherein each of the drive transistors corresponds to one of the pixel electrodes,
  wherein the drive transistor includes a gate electrode disposed on a same layer as the first scan line, an active layer located on a side of the gate electrode distal to the base substrate, and a source-drain electrode disposed on a same layer as the data line,
  a gate insulating layer is formed between the gate electrode and the active layer, wherein the gate insulating layer covers the gate electrode and the first scan line, a passivation layer is formed between the source-drain electrode and the pixel electrode, and the passivation layer covers the source-drain electrode, the data line and the second scan line, and
  the first scan line is electrically connected to the gate electrode, the data line is electrically connected to a source electrode in the source-drain electrode, and the pixel electrode is electrically connected to a drain electrode in the source-drain electrode via a via hole structure penetrating the passivation layer.

In an exemplary embodiment of the present disclosure, the array substrate further includes: an organic insulating layer, formed between the passivation layer and the pixel electrode, wherein the pixel electrode is electrically connected to the drain electrode via a via hole structure penetrating the organic insulating layer and the passivation layer.

In an exemplary embodiment of the present disclosure, the array substrate further includes: a color filter layer, formed between the passivation layer and the organic insulating layer, wherein the pixel electrode is electrically connected to the drain electrode via a via hole structure penetrating the organic insulating layer, the color filter layer and the passivation layer.

In an exemplary embodiment of the present disclosure, the first electrode strips and the second electrode strips are in a bending shape, and the first electrode strips and the second electrode strips are bent with a bending angle of 150° to 170°.

A second aspect of the present disclosure provides a display panel including the array substrate as described in any of the above.

The technical solutions provided by the present disclosure may realize the following beneficial effects:

In the array substrate and the display panel provided by the present disclosure, the pixel electrodes and the common electrodes are disposed on the same layer and interposed to each other. Such design can reduce the capacitance generated between the pixel electrodes and the common electrodes, thereby increasing the charging rate and the aperture ratio of the pixels. Furthermore, the data line is disposed on the inner side of one pixel electrode and the second scan line is disposed between two adjacent columns of pixel electrodes. Such design can increase the distance between the second scan line and the data line, thereby reducing signal crosstalk between the second scan line and the data line such that the Mura phenomenon of the screen can be reduced and the display effect can be improved.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. Apparently, the drawings in the following description are only for illustrating some embodiments of the present disclosure and those of ordinary skill in the art can further derive other drawings based on the drawings without paying any creative labor.

Figure 1:
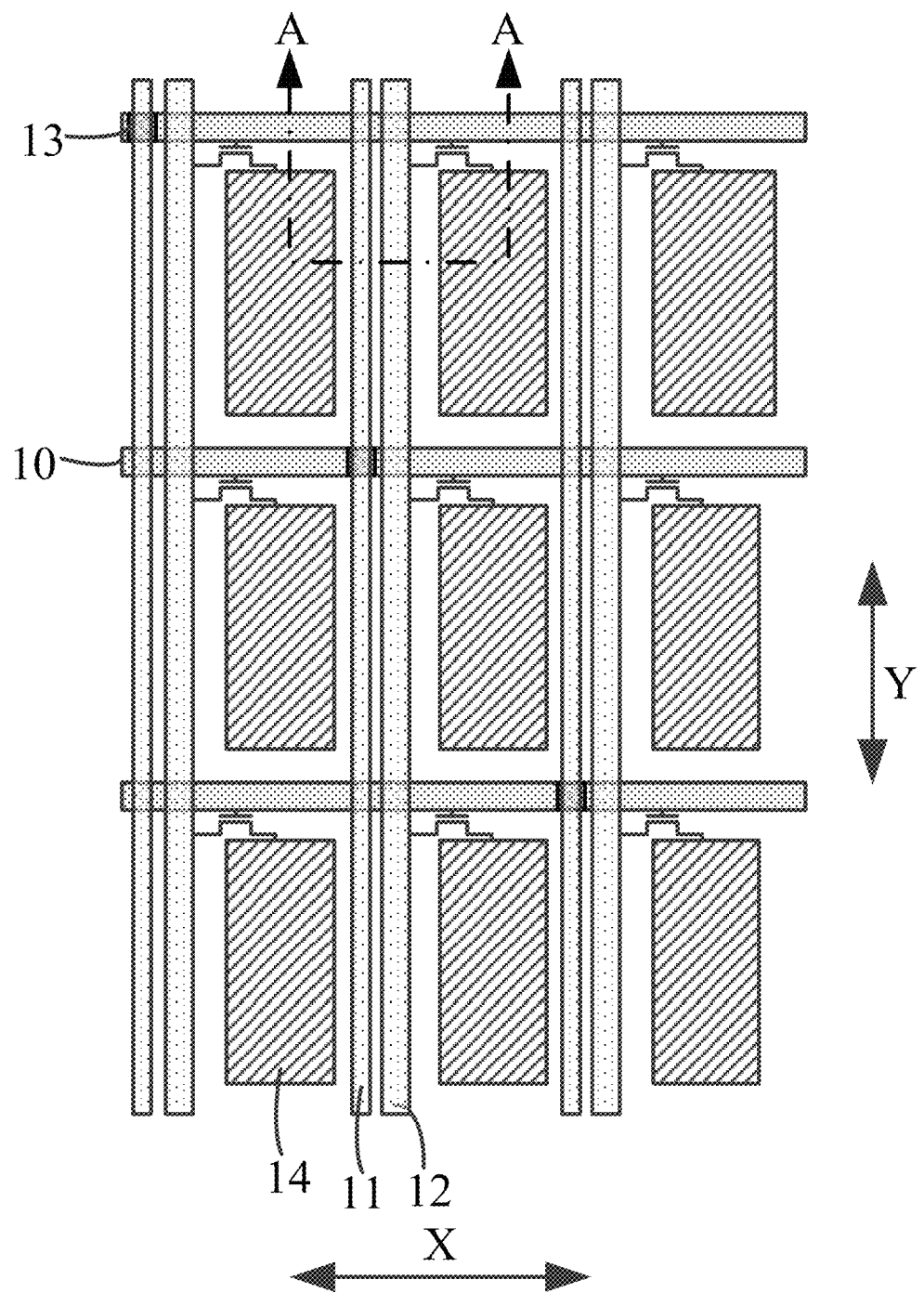
FIG. 1 is a structural schematic diagram illustrating an array substrate described in an embodiment of the present disclosure.
Figure 2:
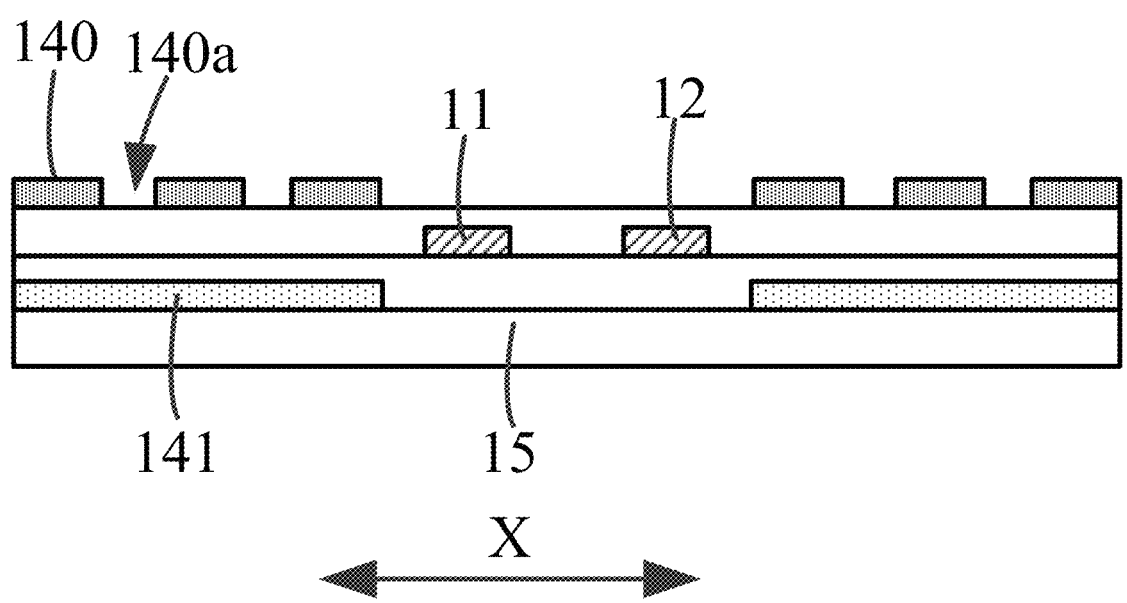
FIG. 2 is a cross-sectional view taken along line A-A of the array substrate shown in FIG. 1.

Reference signs in FIGS. 1 and 2:
10—horizontal scan line; 11—vertical scan line; 12—data line; 13—via hole structure; 14—subpixel; 140—pixel electrode; 140a—slit; 141—common electrode; 15—base substrate;

Reference signs in FIGS. 3 to 17:
2—array substrate; 20—base substrate; 21—pixel electrode; 210—first electrode strip; 211—first conductive connection portion; 22—common electrode; 220—second electrode strip; 221—second conductive connection portion; 23a—first scan line; 23b—second scan line; 24—data line; 25—drive transistor; 250—gate electrode; 251—active layer; 252—source electrode; 253—drain electrode; 26a—first common signal line; 26b—second common signal line; 27a—gate insulating layer; 27b—passivation layer; 27c—organic insulating layer; 27d—color filter layer; 28a—first metal line; 28b—second metal line; 3—opposite substrate; 30—transparent substrate; 31—black matrix layer.

DETAILED DESCRIPTION

To make the objects, technical solutions and advantages of the present disclosure more clear and easy to be understood, embodiments of the present disclosure will be described in detail below in conjunction with the accompanying drawings. Note that the embodiments may be implemented in a number of different forms. A person of ordinary skill in the art could readily appreciate the fact that the manners and contents may be transformed into a variety of forms without departing from the purpose and scope of the present disclosure. Accordingly, the present disclosure should not be construed to be limited only to the contents contained in the following embodiments. If there is no conflict, the embodiments and the features in the embodiments of the present disclosure may be arbitrarily combined with each other.

In the accompanying drawings, sizes of the respective constituent elements, and thickness or region of layers are sometimes represented in an exaggerated way for the sake of clarity. Thus, one manner of the present disclosure is not necessarily limited to that size, and the shape and size of the components in the accompanying drawings do not reflect true proportions. In addition, the accompanying drawings schematically illustrate ideal examples, but one manner of the present disclosure is not limited to the shape or value shown in the accompanying drawings.

The ordinal words such as "first", "second", "third" are set herein to avoid confusion of constituent elements and are not restrictive of the quantity.

In this specification, for the sake of convenience, words indicating the orientation or position relationship such as "middle region", "regions on both sides", "on", "inner" and "outer" are used to illustrate the position relationships of the constituent elements with reference to the accompanying drawings, only to facilitate the description of this specification and simplify the description, instead of indicating or implying that the device or element must have a specific orientation, or must be constructed and operated in a specific orientation, therefore it is not to be construed as a limitation of the present disclosure. The position relationships of the constituent elements vary appropriately depending on the orientation of the described constituent elements. Therefore, the words and phrases are not limited to those described in the specification and may be appropriately replaced according to circumstances.

In this specification, terms such as "mounting", "connection" and "connecting" should be understood in a broad sense unless otherwise expressly specified and provided. For example, it may be a fixed connection, or a detachable connection, or an integral connection; it may be a mechanical connection, or an electrical connection; it may be a direct connection, or an indirect connection through an intermediate member, or a connection within two components. A person of ordinary skill in the art could understand the specific meanings of the above-described terms in the present disclosure in specific cases.

In the present disclosure, unless otherwise specified, the phrase "disposed on the same layer" is used to mean that two layers, parts, components, elements or portions may be formed by the same patterning process and that the two layers, parts, components, elements or portions are generally formed of the same material.

In the present disclosure, unless otherwise specified, the expression of "patterning process" generally includes coating, exposure, development, etching of photoresist, and stripping of the photoresist, etc. The expression of "single patterning process" refers to a process of forming patterned layers, parts, components, etc., using a single mask.

In order to realize full-screen design, an embodiment of the present disclosure provides an array substrate which is applicable to a liquid crystal display panel. As shown in FIG. 1, the array substrate may include horizontal scan lines 10 extending in a row direction X, vertical scan lines 11 extending in a column direction Y, and data lines 12 extending in the column direction Y; the vertical scan lines 11 are electrically connected to the horizontal scan lines 10 through via hole structures 13 respectively, and scan signal input terminals of the vertical scan lines 11 and data signal input terminals of the data lines 12 may be located on the same side of the array substrate, for example, a binding side of the array substrate, so that the other three non-display sides than the binding side in the array substrate may be made very narrow because there are no input ends of the scan lines and input ends of the data lines 12, thus the screen-to-body ratio can be increased, that is, the area of a display region will be increased, to realize full-screen.

It should be noted that structures located in regions divided by the horizontal scan lines 10 and the data lines 12 in FIG. 1 may be subpixels 14. As shown in FIGS. 1 and 2, the vertical scan line 11 and the data line 12 are provided between two adjacent columns of subpixels 14, which makes the signal crosstalk between the vertical scan line 11 and the data line 12 serious.

In addition, as shown in FIG. 2, the subpixel 14 may include a pixel electrode 140 and a common electrode 141. The pixel electrode 140 may be a slit electrode having slits 140a and the common electrode may be a plate electrode without any slit. The common electrode 141 is located on a side of the pixel electrode 140 close to the a base substrate 15; and such design makes the overlapping area between the pixel electrode 140 and the common electrode 141 larger, leading to large capacitance between the pixel electrode 140 and the common electrode 141, so that the charging rate and the aperture ratio of pixels will be greatly affected, resulting in poor display effect. It should be noted that the electric field between the common electrode 141 and the pixel electrode 140 is an electric field for driving liquid crystal.

Figure 3:
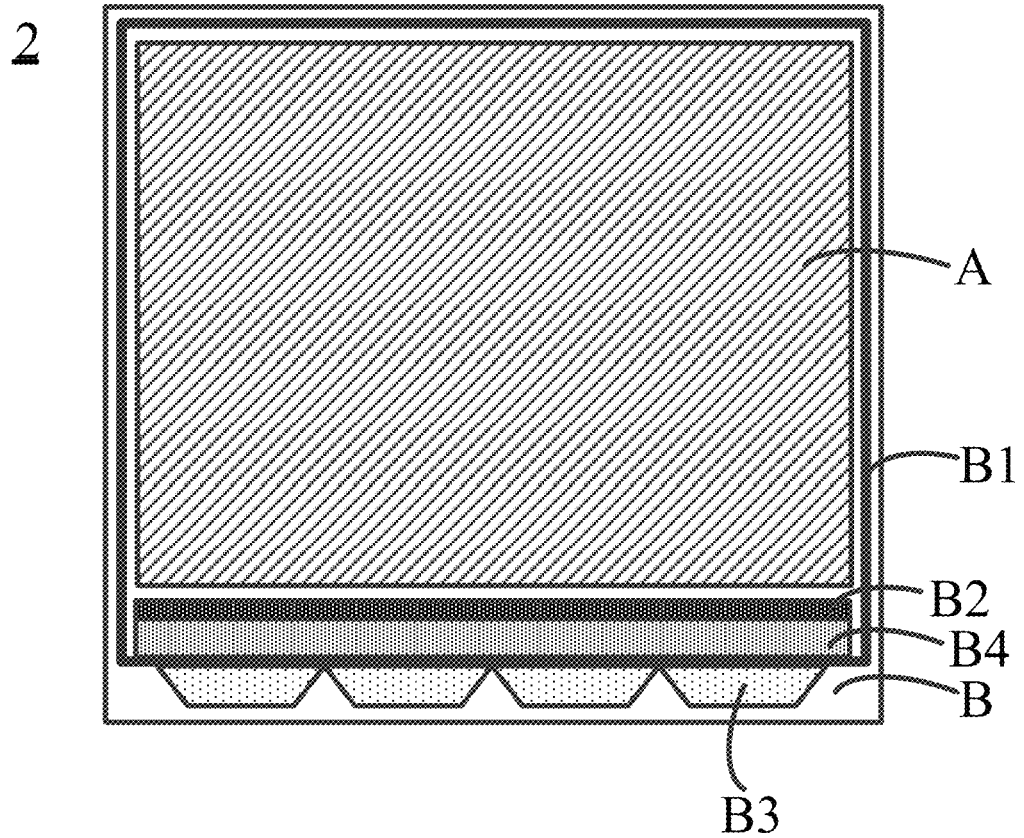
FIG. 3 is a schematic diagram of the distribution of the respective regions of the array substrate described in an embodiment of the present disclosure.

Based on the foregoing, an embodiment of the present disclosure further provides an array substrate which is applicable to a liquid crystal display panel. As shown in FIG. 3, the array substrate 2 may be divided into a display region A and a non-display region B disposed around the display region A. The non-display region B of the array substrate 2 may be provided with a sealing region B1 surrounding the display region A, a source electrostatic discharge region B2 located close to the display region A in the sealing region B1, and a fan-out region B3 located on the side of the sealing region B1 distal to the display region A. The source electrostatic discharge region B2 and the fan-out region B3 are located in the non-display region B on the same side of the display region A (i.e., the binding region).

As shown in FIGS. 4 to 7, the array substrate 2 may include a base substrate 20 and pixel electrodes 21, common electrodes 22, first scan lines 23a, second scan lines 23b, data lines 24, drive transistors 25, first common signal lines 26a and second common signal lines 26b provided on the base substrate 20. The pixel electrodes 21, the common electrodes 22, the first scan lines 23a, the second scan lines 23b, the data lines 24, the drive transistors 25, the first common signal lines 26a and the second common signal lines 26b are all provided in the display region A of the base substrate 20.

The array substrate 2 of the embodiments of the present disclosure will be described in detail below in conjunction with the accompanying drawings.

Figure 5:
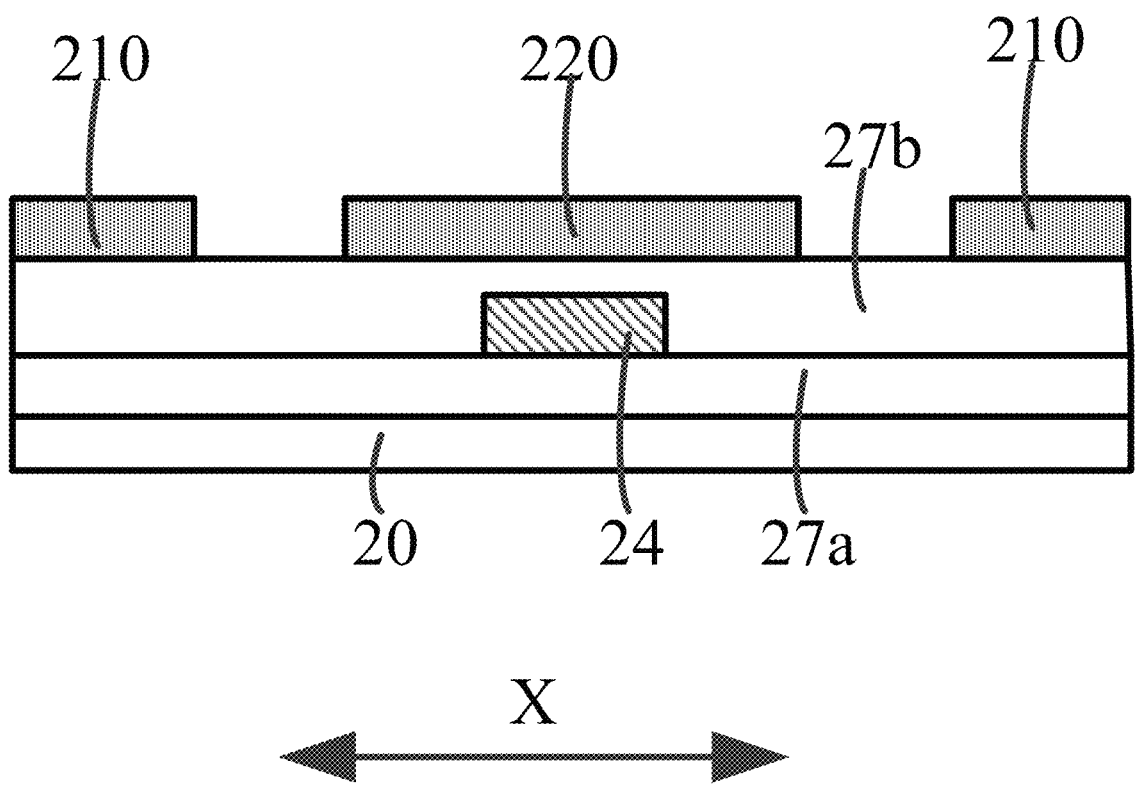
FIG. 5 is a cross-sectional view taken along line B-B of the array substrate shown in FIG. 4.
Figure 6:
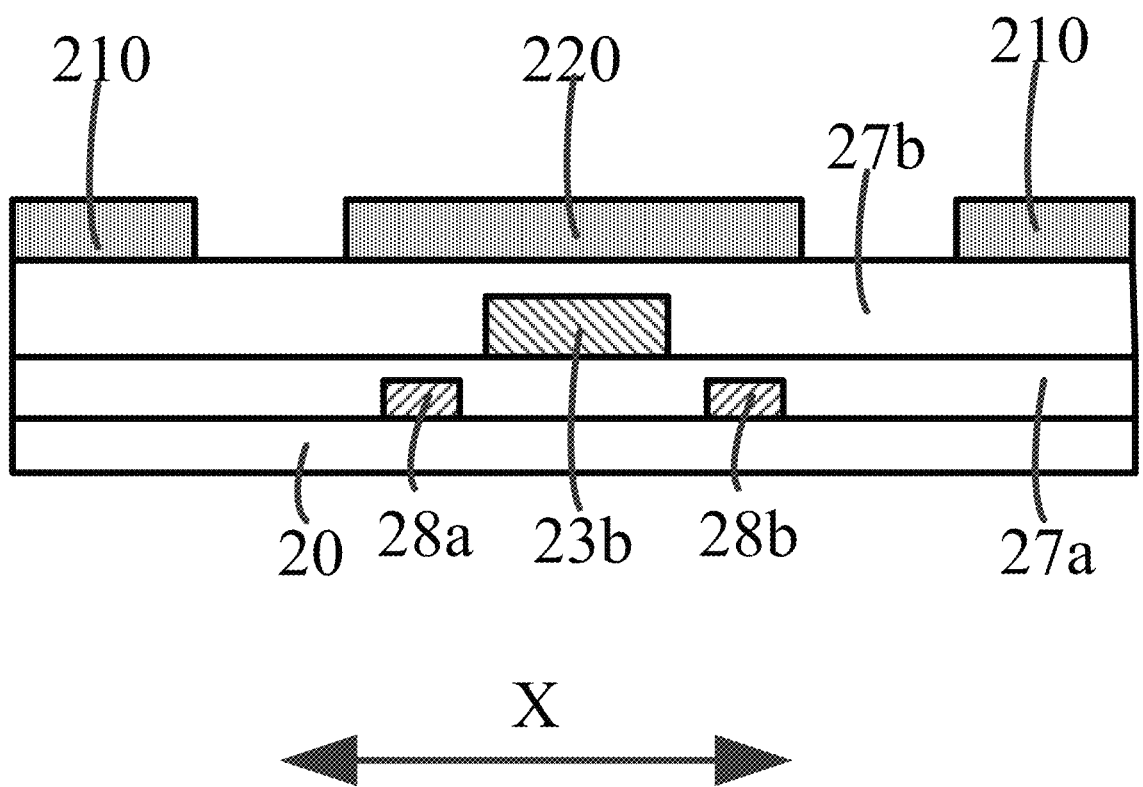
FIG. 6 is a cross-sectional view taken along line C-C of the array substrate shown in FIG. 4.
Figure 7:
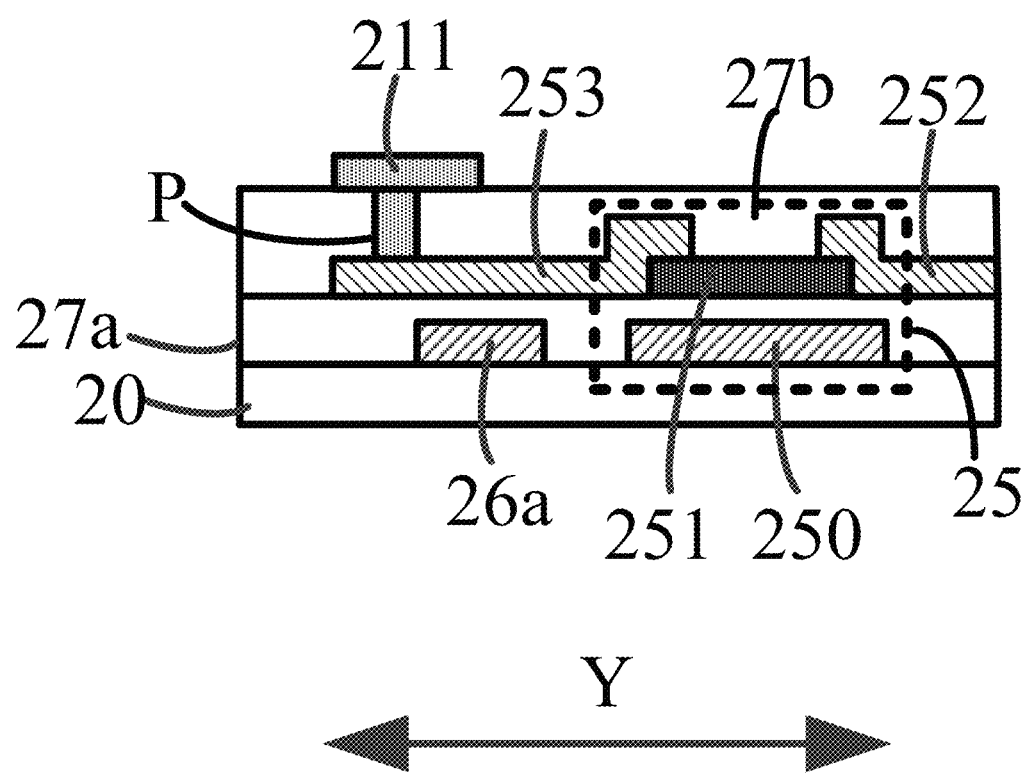
FIG. 7 is a cross-sectional view taken along line D-D of the array substrate shown in FIG. 4.

As shown in FIGS. 5 to 7, the base substrate 20 may be a single-layer structure. For example, the base substrate 20 may be a glass substrate, but it is not limited thereto, and it may be a substrate made of other materials as well. Furthermore, the base substrate 20 may be a multi-layer structure as well, as the case may be.

Figure 4:
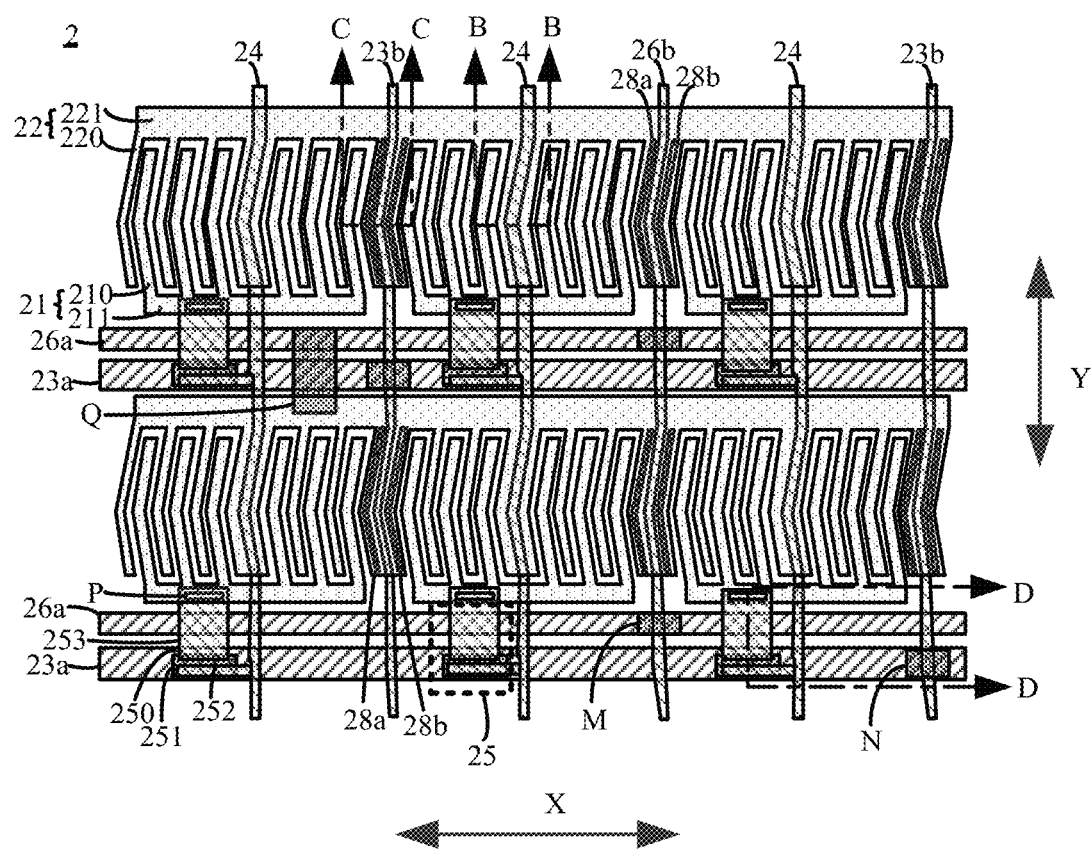
FIG. 4 is a structural schematic diagram illustrating an array substrate described in another embodiment of the present disclosure.

As shown in FIG. 4, a plurality of pixel electrodes 21 may be provided, and the plurality of pixel electrodes 21 may be arranged in the form of array in the row direction X and the column direction Y. Each of the pixel electrodes 21 may have a plurality of first electrode strips 210 disposed at intervals in the row direction X, and each of the pixel electrodes 21 may further have a first conductive connection portion 211 located on the same side of the respective first electrode strips 210 and connected to the respective first electrode strips 210. In other words, the pixel electrodes 21, as a whole, may be "comb-shaped".

Figure 8:
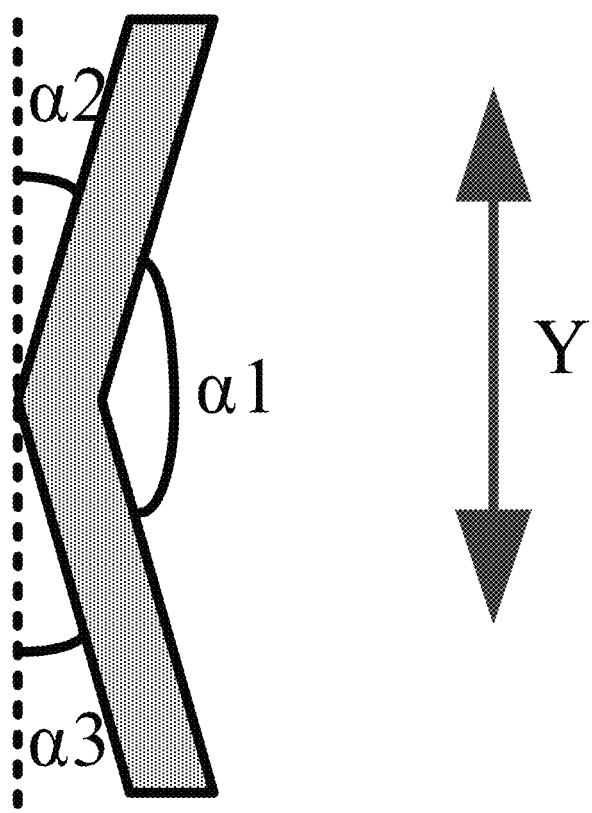
FIG. 8 is a structural schematic diagram illustrating a first electrode strip of a pixel electrode in the array substrate shown in FIG. 4.

As shown in FIGS. 4 and 8, the first electrode strips 210 may be bent with a bending angle α1 of 150° to 170°. Specifically, the first electrode strips 210 may include two parts, and an included angle α1 between the two parts is 150° to 160°, for example, 150°, 156°, 162°, 166°, 170°, etc. In other words, included angles α2, α3 between the extension directions of the two parts and the column direction Y may be 5° to 15°, respectively, for example, 5°, 7°, 9°, 12°, 15°, etc.

As shown in FIG. 4, a plurality of drive transistors 25 may be provided, and the plurality of drive transistors 25 are arranged in the form of array in the row direction X and the column direction Y. Each of the drive transistors 25 may correspond to a pixel electrode 21. Specifically, the drive transistors 25 may include a gate electrode 250, an active layer 251 and a source-drain electrode, respectively. The source-drain electrode may include a source electrode 252 and a drain electrode 253 which are electrically connected to the two ends of the active layer 251, respectively. The drain electrode 253 is electrically connected to a corresponding pixel electrode 21. For example, the gate electrode 250, the source electrode 252 and the drain electrode 253 may be made of metal materials such as aluminum, molybdenum, etc.

As shown in FIG. 7, the drive transistor 25 may be of a bottom-gate type. That is, the active layer 251 is located on the side of the gate electrode 250 distal to the base substrate 20. It should be understood that a gate insulating layer may be formed between the gate electrode 250 and the active layer 251 in order to insulate the active layer 251 from the gate electrode 250. That is to say, in the process of fabricating the array substrate 2, the gate electrode 250 may be formed on the base substrate 20 firstly; thereafter, a gate insulating layer 27a covering the gate electrode 250 is formed; then, the active layer 251 directly facing the gate electrode 250 is formed on the gate insulating layer 27a. It should be noted that the gate insulating layer 27a is provided as an entire layer on the base substrate 20. That is to say, the gate insulating layer 27a may not only cover the gate electrode 250 but also cover other metal structures provided on the same layer as the gate electrode 250. It should be understood that the gate insulating layer 27a may be an inorganic insulating layer.

In addition, the drive transistor 25 is formed on the side of the pixel electrode 21 close to the base substrate 20. That is to say, in the process of fabricating the array substrate 2, the drive transistor 25 may be formed on the base substrate 20 firstly; thereafter, the pixel electrode 21 is formed. It should be noted that a passivation layer 27b may be formed after the source-drain electrode of the drive transistor 25 is formed on the base substrate 20 and before the pixel electrode 21 is formed. As shown in FIG. 7, the passivation layer 27b covers the source-drain electrode, and the pixel electrode 21 may be electrically connected to the drain electrode 253 through a via hole structure P penetrating the passivation layer 27b.

The passivation layer 27b is provided as an entire layer on the base substrate 20. In other words, the passivation layer 27b may cover not only the source-drain electrode but also other metal structures provided on the same layer as the source-drain electrode. It should be understood that the passivation layer 27b may be an inorganic insulating layer.

Figure 10:
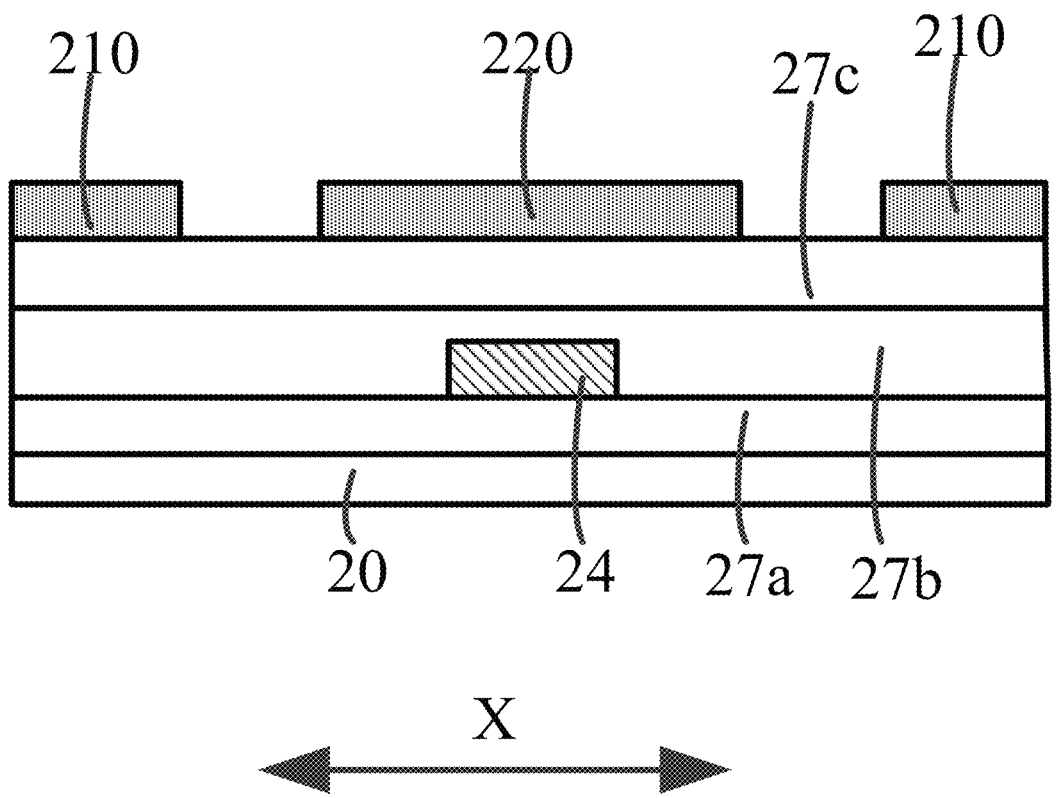
FIG. 10 is a cross-sectional view taken along line B-B of another array substrate shown in FIG. 4.
Figure 12:
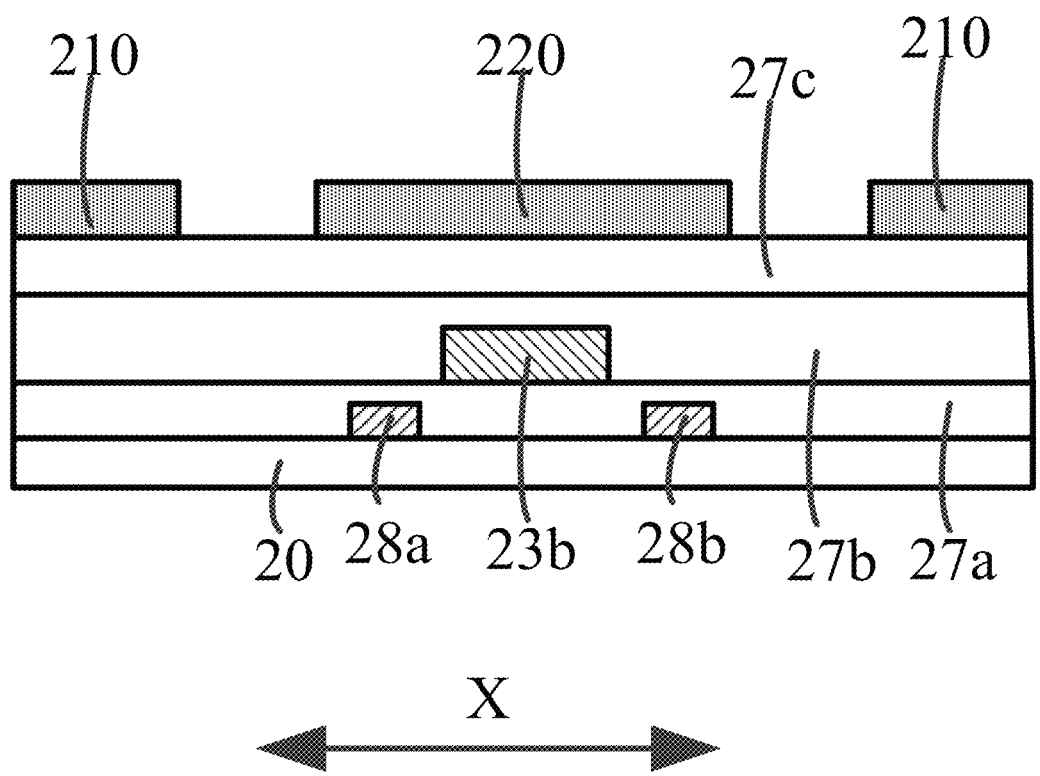
FIG. 12 is a cross-sectional view taken along line C-C of another array substrate shown in FIG. 4.
Figure 14:
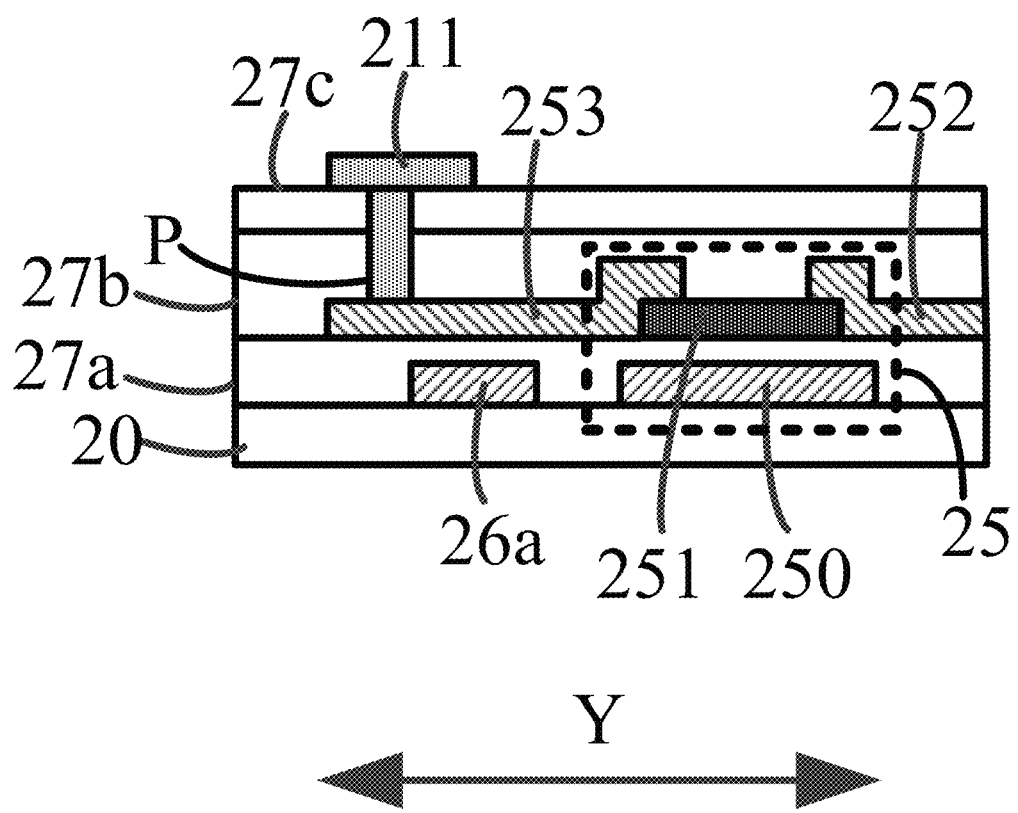
FIG. 14 is a cross-sectional view taken along line D-D of another array substrate shown in FIG. 4.

As shown in FIGS. 10, 12 and 14, an organic insulating layer 27c may further be formed between the passivation layer 27b and the pixel electrodes 21. That is to say, in the process of manufacturing the array substrate 2, the passivation layer 27b may be formed on the base substrate 20 firstly; thereafter, the organic insulating layer 27c may be formed on the passivation layer 27b; then the pixel electrode 21 is formed on the organic insulating layer 27c, wherein the pixel electrode 21 may be electrically connected to the drain electrode 253 via the via hole structure P penetrating the organic insulating layer 27c and the passivation layer 27b.

In the embodiments of the present disclosure, by providing the organic insulating layer 27c, planarization is realized for subsequent coating of the material of the pixel electrode 21 and as the same time, the distance between the pixel electrode 21 and the layer where the source-drain electrode is located may be increased, thus avoiding interference with the pixel electrode 21 by other signal lines on the layer at which the source-drain electrode is located.

It should be noted that the array substrate 2 of the embodiments of the present disclosure may not be provided with the organic insulating layer 27c.

Figure 11:
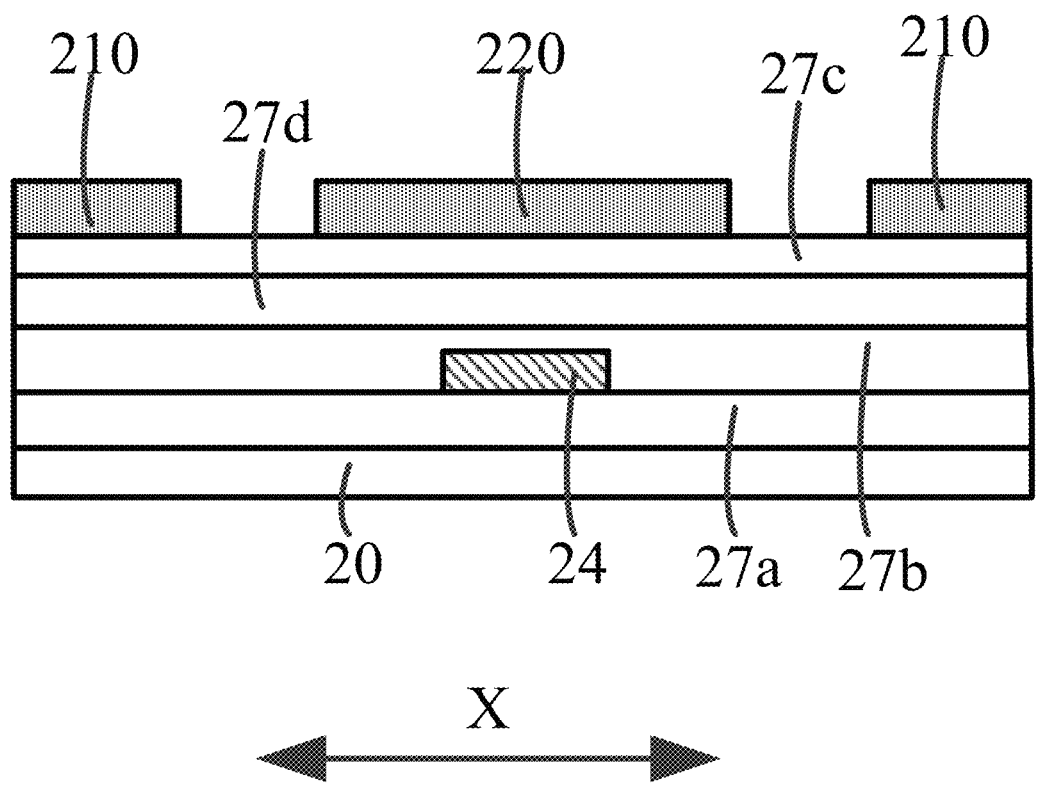
FIG. 11 is a cross-sectional view taken along line B-B of further another array substrate shown in FIG. 4.
Figure 13:
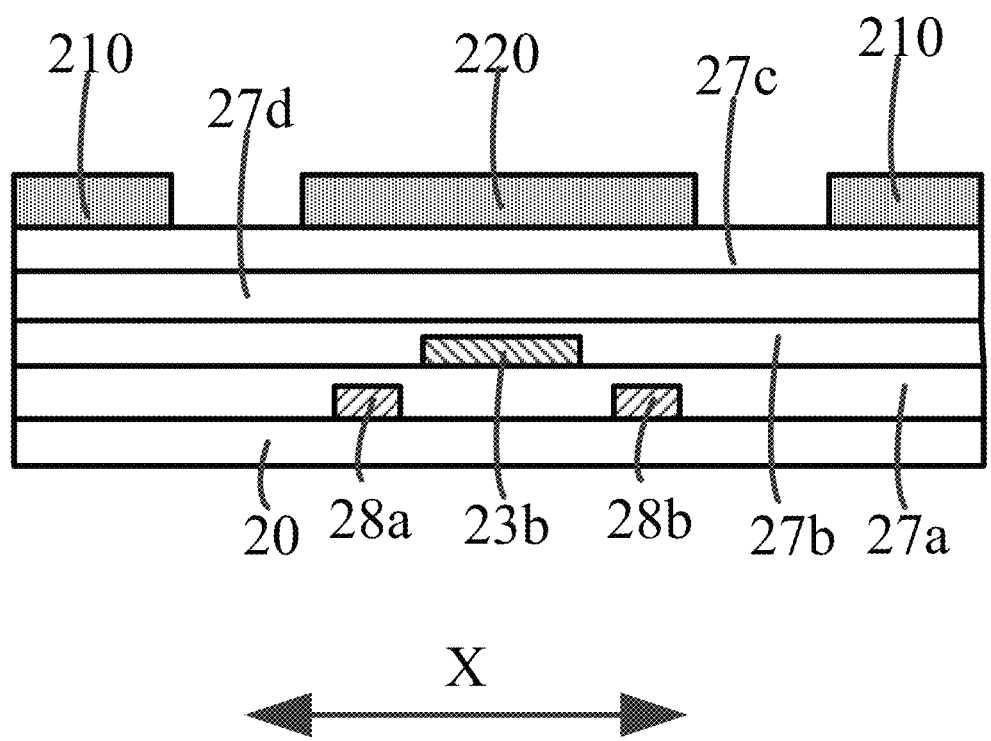
FIG. 13 is a cross-sectional view taken along line C-C of further another array substrate shown in FIG. 4.
Figure 15:
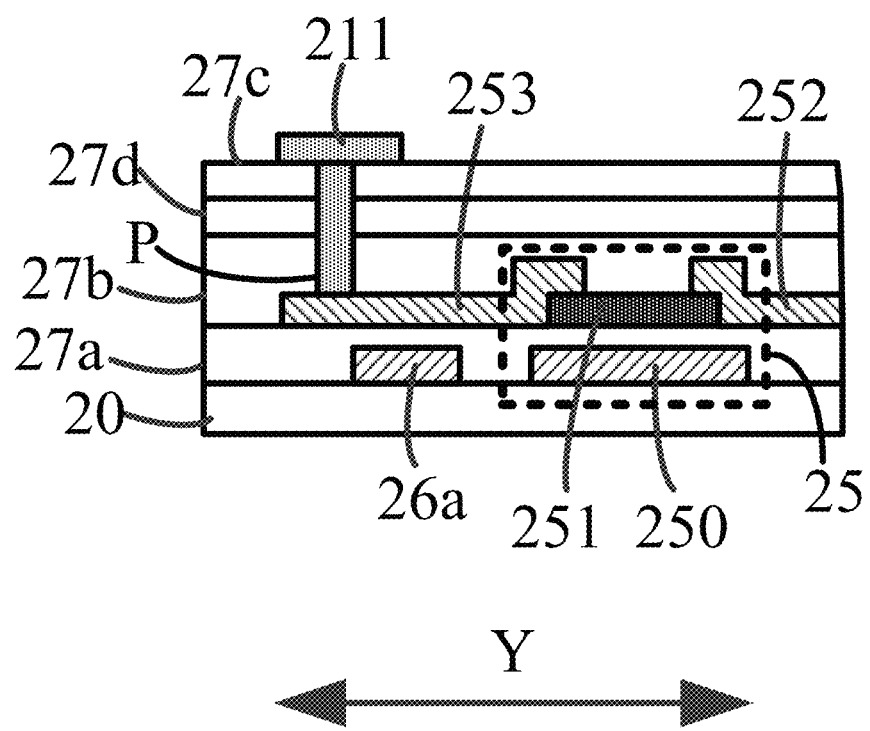
FIG. 15 is a cross-sectional view taken along line D-D of further another array substrate shown in FIG. 4.

As shown in FIGS. 11, 13 and 15, a color filter layer 27d may further be formed between the passivation layer 27b and the organic insulating layer 27c. That is to say, in the process of fabricating the array substrate 2, the passivation layer 27b may be formed on the base substrate 20 firstly; thereafter, the color filter layer 27d may be formed on the passivation layer 27b; then the organic insulating layer 27c may be formed on the color filter layer 27d, wherein the pixel electrode 21 may be electrically connected to the drain electrode 253 via the via hole structure P penetrating the organic insulating layer 27c, the color filter layer 27d and the passivation layer 27b. For example, the color filter layer 27d may include a plurality of color resistance blocks such as a red color resistance block, a green color resistance block, a blue color resistance block, etc. and the color resistance blocks may be provided in one-to-one correspondence with the pixel electrodes 21.

It should be noted that the array substrate 2 of the embodiments of the present disclosure may not be provided with the color filter layer 27d.

Wherein the drive transistor of the embodiments of the present disclosure is not limited to of a bottom gate type, it may be of a top gate type as well, as the case may be.

As shown in FIG. 4, a plurality of common electrodes 22 may be provided, and the common electrodes 22 may be provided on the same layer as the pixel electrodes 21, wherein each of the common electrodes 22 may have a plurality of second electrode strips 220 disposed at intervals in the row direction X, and each of the common electrodes 22 may further have a second conductive connection portion 221 located on the same side of the respective second electrode strips 220 and connected to the respective second electrode strips 220. That is to say, the common electrodes 22, as a whole, may be "comb-shaped", wherein the second electrode strips 220 of the common electrode 22 and the first electrode strips 210 of the pixel electrode 21 are alternatively arranged in the row direction X. In other words, the common electrodes 22 and the pixel electrodes 21 located in the same row are interposed with each other, the design of which can reduce the capacitance generated between the pixel electrode 21 and the common electrode 22, thereby increasing the charging rate and the aperture ratio of the pixels.

It should be understood that there should be a gap between, the first electrode strips 210 and the first conductive connection portion 211 of the pixel electrode 21, and the second electrode strips 220 and the second conductive connection portion 221 of the common electrode 22, to avoid an electrically-conductive state between the pixel electrode 21 and the common electrode 22.

Figure 9:
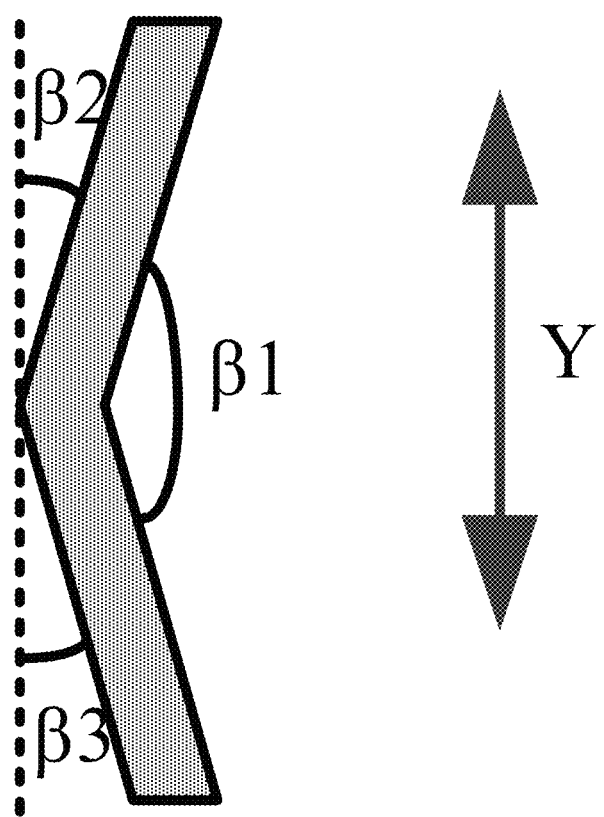
FIG. 9 is a structural schematic diagram illustrating a second electrode strip of a common electrode in the array substrate shown in FIG. 4.

As shown in FIGS. 4 and 9, the second electrode strip 220 may be bent with a bending angle β1 of 150° to 170°. Specifically, the second electrode strip 220 may include two parts, and an included angle β1 between the two parts is 150° to 160°, for example, 150°, 156°, 162°, 166°, 170°, etc. In other words, included angles β2, β3 between the extension directions of the two parts and the column direction Y are 5° to 15°, respectively, for example, 5°, 7°, 9°, 12°, 15°, etc.

It should be noted that the second electrode strips 220 may be substantially parallel to the first electrode strips 210. That is to say, the bending angle β1 of the second electrode strip 220 may be the same as the bending angle α1 of the first electrode strip 210.

Based on the foregoing, by providing the first electrode strips 210 of the pixel electrode 21 and the second electrode strips 220 of the common electrode 22 in a bent shape, color shift can be reduced and the display effect can be improved.

As shown in FIG. 4, the number of the common electrodes 22 may be smaller than the number of the pixel electrodes 21 in each row. That is to say, one common electrode 22 may be interposed with a plurality of pixel electrodes 21 in each row. For example, in each row, a plurality of pixel electrodes 21 may be provided, one common electrode 22 may be provided, and the one common electrode 22 is interposed with all of the pixel electrodes 21 in each row. However, it is not limited thereto, and in each row, a plurality of common electrodes 22 may be provided as well, and the common electrodes 22 may be interposed with the pixel electrodes 21 in one-to-one correspondence, or one-to more correspondence, depending on the case.

It should be noted that the aforementioned common electrodes 22 and pixel electrodes 21 may be transparent electrodes, and the common electrodes 22 may be made of metal materials such as silver nanowire, or made of semiconductor oxide such as Indium Tin Oxide (ITO).

As shown in FIG. 4, the first common signal lines 26a may be provided in a plurality of rows. The first common signal lines 26a may be formed between the base substrate 20 and the common electrode 22. As previously mentioned, the common electrodes 22 and the pixel electrodes 21 are provided on the same layer. That is to say, in the process of fabricating the array substrate 2, the first common signal lines 26a may be formed on the base substrate 20 firstly, then the pixel electrodes 21 and the common electrodes 22 are formed, wherein each of the first common signal lines 26a may be located between two adjacent rows of the pixel electrodes 21 and is electrically connected to one corresponding row of the common electrodes 22.

For example, as shown in FIG. 4, the first common signal line 26a may be provided on the same layer as the gate electrode 250 of the drive transistor 25. In this case, the first common signal line 26a is electrically connected to the common electrode 22 through a via hole structure Q. It should be noted that the via hole structure Q mentioned here may penetrate at least the passivation layer 27b and the gate insulating layer 27a. When the array substrate 2 includes the aforementioned organic insulating layer 27c and the color filter layer 27d, the via hole structure Q penetrates the organic insulating layer 27c and the color filter layer 27d in addition to the passivation layer 27b and the gate insulating layer 27a.

As shown in FIG. 4, one or more columns of second common signal lines 26b may be provided. The second common signal lines 26b may be formed between the base substrate 20 and the common electrodes 22. As previously mentioned, the common electrodes 22 and the pixel electrodes 21 are disposed on the same layer. That is, in the process of fabricating the array substrate 2, the second common signal lines 26b may be formed on the base substrate 20 firstly and then the pixel electrodes 21 and the common electrodes 22 may be formed, wherein each of the second common signal lines 26b may be located between two adjacent columns of the pixel electrodes 21, and both sides of the second common signal line 26b in the row direction X may be located within both sides of a second electrode strip 220 of a common electrode 22 in the row direction X. The second electrode stripe 220 may function to shield signals, that is, it can shield common signals on the second common signal line 26b and prevent the common signals from affecting the electric field formed between the pixel electrode 21 and the common electrode 22.

By way of example, a shape of a portion of the second common signal line 26b corresponding to the first electrode strip 210 may match the shape of the first electrode strip 210. That is, when the first electrode strip 210 is in a bending shape, the portion of the second common signal line 26b corresponding to the first electrode strip 210 may be in a bending shape as well and may be substantially parallel to the first electrode strip 210.

The size of the second common signal line 26b in the row direction X is d1, as shown in FIG. 4, the size of the second electrode strip 220 located above the second common signal line 26b in the row direction X is d2, wherein a ratio of d1 to d2 is greater than 0.5 and less than 1, for example, 0.5, 0.6, 0.7, 0.8, 0.9, 0.95, etc. However, it is not limited thereto, and the ratio of d1 to d2 may be less than 0.5 as well, as the case may be.

It should be noted that the second electrode strip 220 located above the second common signal line 26b mentioned in the embodiments of the present disclosure refers to the second electrode strip 220 whose orthographic projection obtained on the base substrate 20 overlaps the orthographic projection of the second common signal line 26b.

The second common signal line 26b may be electrically connected to the first common signal line 26a in the respective rows. The second common signal line 26b may have a common signal input terminal. That is to say, the common signal may be transferred to the common electrodes 22 via the second common signal line 26b and the first common signal lines 26a in turn. For example, the second common signal line 26b and the source-drain electrode of the drive transistor 25 may be provided on the same layer. In this case, as shown in FIG. 4, the second common signal line 26b may be electrically connected to the first common signal lines 26a in the respective rows through via hole structures M. It should be noted that the via hole structure M mentioned herein may penetrate the gate insulating layer 27a.

In the embodiments of the present disclosure, by providing the first common signal lines 26a and the second common signal lines 26b, it is realized to transmit the common signals to the common electrodes 22 of the entire array substrate 2, and at the same time, the number of common signal terminals will be greatly reduced, thereby reducing the number of leads and the cost.

It should be understood that in the embodiments of the present disclosure, only the first common signal line 26a may be provided, or only the second common signal line 26b may be provided, as the case may be.

As shown in FIG. 4, a plurality of rows of the first scan lines 23a may be provided. The first scan lines 23a may be formed between the base substrate 20 and the pixel electrodes 21. That is, in the process of fabricating the array substrate 2, the first scan lines 23a may be formed on the base substrate 20 firstly and then the pixel electrodes 21 may be formed, wherein the first scan lines 23a may be located between two adjacent rows of the pixel electrodes 21.

For instance, the first scan line 23a and the first common signal line 26a may be provided on the same layer. Since the first common signal line 26a and the gate electrode 250 of the drive transistor 25 may be provided on the same layer as previously mentioned, the first scan line 23a and the gate electrode 250 of the drive transistor 25 are provided on the same layer as well. It should be understood that there is a gap between the first scan line 23a and the first common signal line 26a. In other words, the first scan line 23a is not electrically connected to the first common signal line 26a, but the first scan line 23a is electrically connected to the gate electrode 250 of the drive transistor 25.

A row of the first common signal lines 26a and a row of the first scan lines 23a may be provided between two adjacent rows of the pixel electrodes 21, wherein the first scan line 23a is electrically connected to the gate electrodes 250 of the drive transistors 25 corresponding to one row of the pixel electrodes 21, while the first common signal line 26a is electrically connected to the common electrode 22 corresponding to the other row of the pixel electrodes 21 through the via hole structure Q.

As shown in FIG. 4, a plurality of columns of second scan lines 23b may be provided. The second scan lines 23b may be formed between the base substrate 20 and the pixel electrodes 21. That is to say, in the process of fabricating the array substrate 2, the second scan lines 23b may be formed on the base substrate 20 firstly and then the pixel electrodes 21 may be formed, wherein the second scan line 23b may be located between two adjacent columns of the pixel electrodes 21. For example, the shape of a portion of the second scan line 23b corresponding to the first electrode strip 210 may match the shape of the first electrode strip 210. That is, when the first electrode strip 210 is in a bending shape, the portion of the second scan line 23b corresponding to the first electrode strip 210 may be in a bending shape as well and may be substantially parallel to the first electrode strip 210.

It should be noted that, since the first scan line 23a is located between two adjacent rows of the pixel electrodes 21 and the second scan line 23b is located between two adjacent columns of the pixel electrodes 21, in order to avoid unnecessary electrical connection between the second scan line 23b and other first scan lines 23a, the second scan line 23b and the first scan line 23a may be provided on different layers, and an insulating layer may be provided between the second scan line 23b and the first scan line 23a, wherein the second scan line 23b has a scan signal input terminal, in order to enable a scan signal received by the second scan line 23b to be transmitted to a particular first scan line 23a, as shown in FIG. 4, a via hole structure N corresponding to the first scan line 23a may be provided in the insulating layer, and the second scan line 23b may be electrically connected to the first scan line 23a through the via hole structure N. Based on this structure, the scan signal may be transmitted to the gate electrode 250 of the corresponding drive transistor 25 through the second scan line 23b, the via hole structure N and the first scan line 23a in turn, to control on/off of the drive transistor 25.

For example, the second scan line 23b and the second common signal line 26b may be provided on the same layer, and since the second common signal line 26b and the source-drain electrode of the drive transistor 25 may be disposed on the same layer as previously mentioned, the second scan line 23b and the source-drain electrode of the drive transistor 25 may be disposed on the same layer as well. It should be noted that, as previously mentioned that the second scan line 23b is electrically connected to the first scan line 23a through the via hole structure N, the via hole structure N mentioned here may penetrate the passivation layer 27b.

In order to ensure display uniformity, the number of signal lines between the respective two adjacent columns of the pixel electrodes 21 in the array substrate 2 may be the same, so that in the embodiments of the present disclosure, as shown in FIG. 4, a column of the second scan lines 23b may be provided between two adjacent columns of the pixel electrodes of one portion of the pixel electrodes, and a column of the second common signal lines 26b may be provided between two adjacent columns of the pixel electrodes 21 of another portion of the pixel electrodes.

It should be noted that, as mentioned earlier, one common electrode 22 may be interposed with a plurality of pixel electrodes 21 in each row. That is to say, a second electrode strip 220 of the common electrode 22 is disposed between the adjacent first electrode strips 210 of the pixel electrode as well. Specifically, as shown in FIGS. 6, 12 and 13, both sides of the second scan line 23b in the row direction X may be located within both sides of a second electrode strip 220 in the row direction X. The second electrode stripe 220 may function to shield signals, that is, it can shield scan signals on the second scan line 23b, and prevent the scan signals from affecting the electric field formed between the pixel electrode 21 and the common electrode 22.

The size of the second scan line 23b in the row direction X is d3, as shown in FIG. 6, the size of the second electrode strip 220 located above the second scan line 23b in the row direction X is d4. The ratio of d3 to d4 is greater than 0.5 and less than 1, for example, 0.5, 0.7, 0.8, 0.9, 0.95, etc., but it is not limited thereto, and the ratio of d3 to d4 may be less than 0.5 as well, depending on the case.

It should be noted that the second electrode strip 220 located above the second scan line 23b mentioned in the embodiments of the present disclosure refers to the second electrode strip 220 whose orthographic projection obtained on the base substrate 20 overlaps the orthographic projection of the second scan line 23b.

Figure 16:
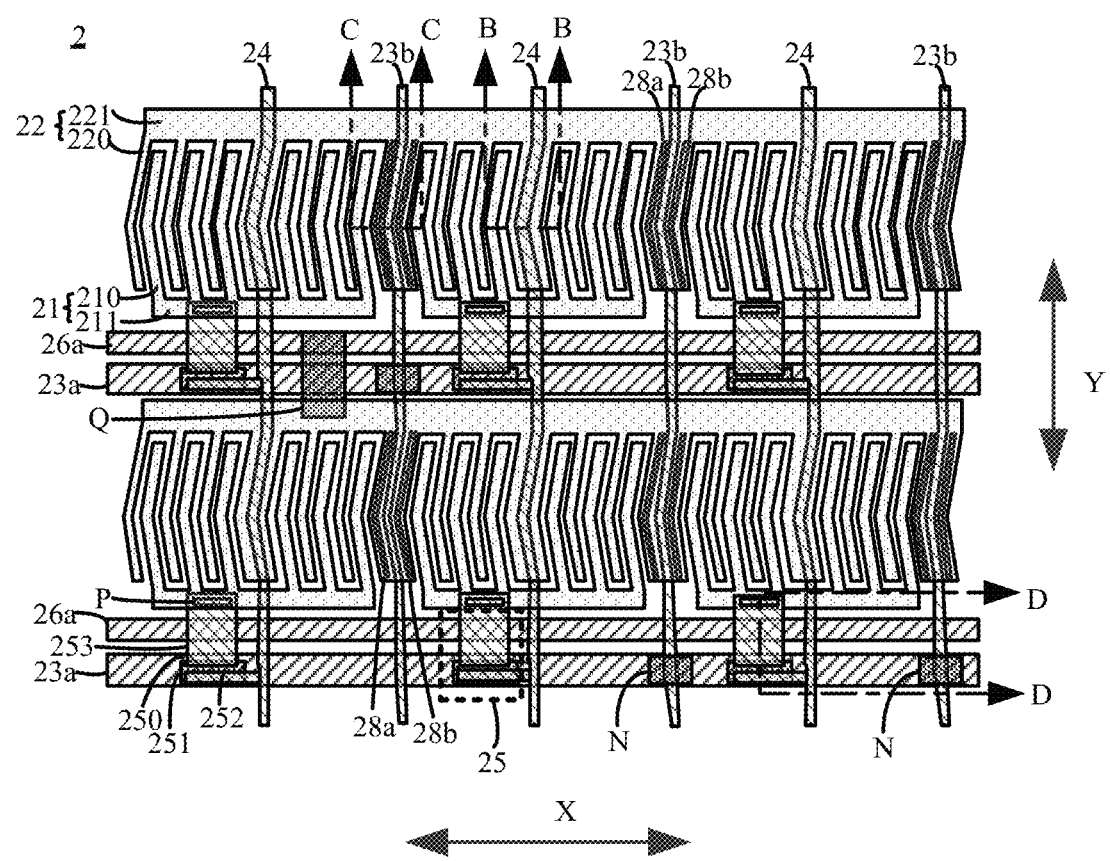
FIG. 16 is a structural schematic diagram illustrating an array substrate described in further another embodiment of the present disclosure.

In the embodiments of the present disclosure, as shown in FIG. 16, each row of the first scan lines 23a may be electrically connected to two or more columns of the second scan lines 23b. That is to say, each row may be driven by two sets of scan signals or more scan signals, so that the scan signals may be enhanced to improve the display effect, and furthermore, such design may be used for splicing display products.

It should be noted that, each row of the first scan line 23a is not limited to being electrically connected to two or more columns of the second scan lines 23b, and it may be electrically connected to only one column of the second scan lines 23b, as the case may be.

As shown in FIG. 4, a plurality of columns of data lines 24 may be provided. The data lines 24 are formed between the base substrate 20 and the pixel electrodes 21. That is to say, in the process of fabricating the array substrate 2, the data lines 24 may be formed on the base substrate 20 firstly and then the pixel electrodes 21 may be formed, wherein the data lines 24 have data signal input terminals and the data lines 24 may be electrically connected to the source electrodes 252 of the drive transistors 25 respectively. That is to say, data signals may be transmitted to the source electrodes 252 through the data lines 24.

For example, the data lines 24 and the second scan lines 23b may be provided on the same layer. Since the second scan line 23b and the source-drain electrode of the drive transistor 25 may be provided on the same layer as previously mentioned, the data line 24 and the source-drain electrode of the drive transistor 25 may be provided on the same layer as well.

As mentioned earlier, the second scan line 23b is provided between two adjacent columns of pixel electrodes 21, and in order to reduce signal crosstalk between the second scan line 23b and the data line 24, in the embodiments of the present disclosure, as shown in FIGS. 4, 10 and 11, two sides of the data line 24 in the row direction X may be located within both sides of a pixel electrode 21 in the row direction X. Compared to the solution in which both the data line 24 and the second scan line 23b are disposed between the same two adjacent columns of pixel electrodes 21, such design increases the distance between the second scan line 23b and the data line 24, thereby reducing the signal crosstalk between the second scan line 23b and the data line 24, such that the Mura phenomenon of the screen may be reduced and the display effect may be improved.

Optionally, the distances from the two sides of the data line 24 in the row direction X to the center of the pixel electrode 21 in the row direction X are equal to each other. In other words, the data line 24 may be provided with respect to the center of the pixel electrode 21 in the row direction X, to balance the signal crosstalk on both sides of the data line 24, thus ensuring uniformity of the screen.

As shown in FIGS. 4, 5, 10 and 11, as mentioned above, the both sides of the data line 24 in the row direction X may further be located within the both sides of second electrode strips 220 in the row direction X. The second electrode stripe 220 can play the role of shielding, that is, it can shield data signals on the data line 24 and prevents the data signals from affecting the electric field formed between the pixel electrode 21 and the common electrode 22.

For example, the shape of a portion of the data line 24 corresponding to the second electrode strip 220 may match the shape of the second electrode strip 220. That is, when the second electrode strip 220 is in a bending shape, the portion of the data line 24 corresponding to the second electrode strip 220 may be in a bending shape as well and may be substantially parallel to the second electrode strip 220.

The size of the data line 24 in the row direction X is d5, as shown in FIG. 5, the size of the second electrode strip 220 located above the data line 24 in the row direction X is d6, wherein the ratio of d5 to d6 is greater than 0.5 and less than 1, for example, 0.5, 0.6, 0.7, 0.8, 0.9, 0.95, etc. However, it is not limited thereto, and the ratio of d5 to d6 may be less than 0.5 as well, depending on the case.

It should be noted that the second electrode strip 220 located above the data line 24 mentioned in the embodiments of the present disclosure refers to the second electrode strip 220 whose orthographic projection obtained on the base substrate 20 overlaps the orthographic projection of the data line 24.

As shown in FIGS. 4, 6, 12 and 13, the array substrate 2 of the embodiments of the present disclosure may further include first metal lines 28a and second metal lines 28b. The first metal lines 28a and the second metal lines 28b may be provided on the same layer as the first scan lines 23a, and the first metal lines 28a and the second metal lines 28b are disconnected from the first scan lines 23a respectively, i.e., not electrically connected to the first scan lines 23a.

Orthographic projections of the first metal line 28a and the second metal line 28b on the base substrate 20 may be located within an orthographic projection of a second electrode strip 220 on the base substrate 20. As shown in FIGS. 6, 12 and 13, the first metal line 28a and the second metal line 28b may be located on the two sides of the second scan line 23b in the row direction X, respectively. The first metal line 28a and the second metal line 28b can function to shield signals, that is, it can shield the scan signals of the second scan line 23b, so as to prevent the scan signals from affecting the electric field formed between the pixel electrode 21 and the common electrode 22. In addition, the first metal line 28a and the second metal line 28b may further function to shield light.

As shown in FIG. 4, when the array substrate 2 of the present disclosure has the aforementioned second common signal line 26b, the second common signal line 26b may be provided with the first metal line 28a and the second metal line 28b on both sides thereof in the row direction X as well. Such design can shield the common signals, so as to prevent the common signals from affecting the electric field formed between the pixel electrode 21 and the common electrode 22, and at the same time, can ensure the uniformity of the screen.

In addition, the data line 24 may be provided with the first metal line 28a and the second metal line 28b on both sides thereof in the row direction X as well. Such design may shield data signals, so as to prevent the data signals from affecting the electric field formed between the pixel electrode 21 and the common electrode 22. However, it is not limited thereto, and the data line 24 may not be provided with any one of the first metal wire 28a and the second metal wire 28b on both sides thereof in the row direction X.

For example, the shape of the first metal line 28a and the second metal line 28b may match the shape of the second electrode strip 220, that is, when the second electrode strip 220 is in a bending shape, the first metal line 28a and the second metal line 28b may be in a bending shape as well and may be substantially parallel to the second electrode strip 220.

It should be noted that, as shown in FIG. 4, the second electrode strips 220 of the common electrode 22 corresponding to the data line 24, the second scan line 23b or the second common signal line 26b may have a size in the row direction X larger than that of other second electrode strips 220 in the row direction X, so as to more effectively shield the data signals, the scan signals or the common signals, to prevent the data signals, the scan signals or the common signals from affecting the electric field formed between the pixel electrode 21 and the common electrode 22.

The size of the second electrode strips 220 of the common electrode 22 corresponding to the data line 24, the second scan line 23b or the second common signal line 26b in the row direction X is d7, and the size of other second electrode strips 220 in the row direction X is d8, wherein the ratio of d8 to d7 is 0.1 to 0.5, for example, 0.1, 0.2, 0.3, 0.4, 0.5, etc. However, it is not limited thereto, and the ratio of d8 to d7 may be greater than 0.5 and less than 1 as well, as the case may be. In the embodiments of the present disclosure, the scan signal input terminals of the second scan lines 23b, the common signal input terminals of the second common signal lines 26b and the data signal input terminals of the data lines 24 mentioned above may be located on the same side of the base substrate 20. For example, the base substrate has a first side and a second side provided opposite to each other in the column direction Y. The scan signal input terminals of the second scan lines 23b, the common signal input terminals of the second common signal lines 26b and the data signal input terminals of the data lines 24 are all close to the first side or the second side, such that other sides of the base substrate 20 can be provided with none of the scan signal input terminals of the second scan lines 23b, the common signal input terminals of the second common signal lines 26b and the data signal input terminals of the data lines 24, therefore, the said other sides of the base substrate 20 can be made very narrow, thus the percentage of a display region A can be increased, so as to realize a full-screen display.

It should be noted that, as shown in FIG. 3, the region B4 where a gate drive circuit for providing the scan signals to the second scan line 23b is located, may be located in the non-display region B, specifically, located between the source electrostatic discharge region B2 and the fan-out region B3, and located on the inner side of the sealing region B1. However it is not limited thereto, the gate drive circuit for providing the scan signals to the second scan line 23b may not be provided on the base substrate 20 and it may be electrically connected to the second scan line 23b on the base substrate 20 by a flexible circuit board.

Furthermore, it should be further noted that the via hole structures P, Q, M and N mentioned in the present disclosure may be structures of holes with conductive materials filled therein.

Figure 17:
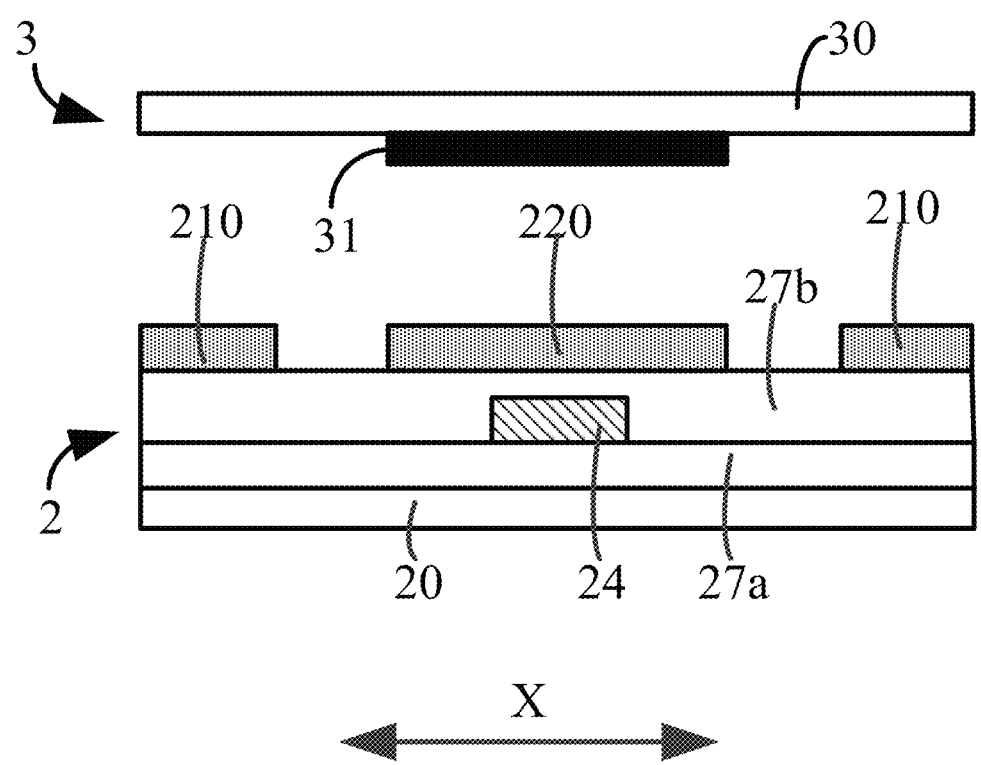
FIG. 17 is a schematic diagram of the position relationship between the array substrate and an opposite substrate in a display panel described in an embodiment of the present disclosure.

An embodiment of the present disclosure further provides a display panel including the array substrate 2 as described in any of the above-described embodiments. It should be understood that the display panel may be a liquid crystal panel. Therefore, as shown in FIG. 17, the display panel may further include an opposite substrate 3 provided opposite to the array substrate 2, and liquid crystal molecules (not shown in FIG. 17) disposed between the opposite substrate 3 and the array substrate 2.

When the array substrate 2 has the aforementioned color filter layer 27d, the opposite substrate 3 may not need to be provided with the color filter layer 27d. At this time, the opposite substrate 3 may include a transparent substrate 30 and a black matrix layer 31 provided on the side of the transparent substrate 30 facing the array substrate 2. The black matrix layer 31 is configured to shield opaque structures in the array substrate 2, for example, the drive transistors 25, the first scan lines 23a, the second scan lines 23b, the data lines 24, the first common signal lines 26a, the second common signal lines 26b, the first metal lines 28a and the second metal lines 28b, etc.

It should be understood that, if the array substrate 2 does not have the color filter layer 27d as previously mentioned, the color filter layer 27d may be provided in the opposite substrate 3.

An embodiment of the present disclosure further provides an electronic device including a display panel as described above.

In the embodiment of the present disclosure, the specific type of the electronic equipment is not particularly limited, as long as it is the type of electronic device that is commonly used in the field, for example, LCD TVs, mobile phones, computers, watches and so on, and a person skilled in the art may correspondingly choose the electronic device according to the concrete purpose thereof, which will not be elaborated here.

It should be noted that the electronic device further includes other necessary parts and components in addition to the display panel. Taking a display as an example, it may specifically include housing, a circuit board, a power cord, etc., for example. Those of ordinary skill in the art could make a supplementary accordingly based on to the specific use requirements of the electronic device, which will not be elaborated here.

Other embodiments of the invention will be apparent to those skilled in the art from consideration of the specification and practice of the invention disclosed here. This application is intended to cover any variations, uses, or adaptations of the discourse following the general principles thereof and including such departures from the present disclosure as come within known or customary practice in the art. It is intended that the specification and examples be considered as exemplary only, with a true scope and spirit of the invention being indicated by the appended claims.

What is claimed is:

1. An array substrate, comprising:
   a base substrate;
   a plurality of pixel electrodes, arranged in a form of array on the base substrate in a row direction and a column direction, wherein each of the pixel electrodes has a plurality of first electrode strips disposed at intervals in the row direction, and a first conductive connection portion located on a same side of the plurality of first electrode strips and connected to the plurality of first electrode strips; and each of the pixel electrodes is comb-shaped as a whole;
   a plurality of common electrodes, disposed on a same layer as the pixel electrodes, wherein each of the common electrodes has a plurality of second electrode strips disposed at intervals in the row direction, and a second conductive connection portion located on a same side of the plurality of second electrode strips and connected to the plurality of second electrode strips;

each of the common electrodes is comb-shaped as a whole; and the second electrode strips and the first electrode strips are alternatively arranged in the row direction;

a plurality of rows of first scan lines, formed between the base substrate and the pixel electrodes, wherein each row of the first scan lines is located between two adjacent rows of the pixel electrodes;

a plurality of columns of second scan lines, formed between the base substrate and the pixel electrodes, wherein each column of the second scan lines is located between two adjacent columns of the pixel electrodes and is electrically connected to the corresponding first scan line through a via hole structure, and a second scan line has a scan signal input terminal; and a plurality of columns of data lines, formed between the base substrate and the pixel electrodes, wherein each column of the data lines has a data signal input terminal, a data line is provided with respect to a center of a pixel electrode in the row direction, and a size of the data line in the row direction is small than a size of a second electrode strip located above the data line in the row direction;

wherein, the array substrate further comprises first metal lines and second metal lines, a first metal line and a second metal line are located close to at least one of the second scan line or the data line in the row direction.

2. The array substrate according to claim 1, wherein orthographic projections of the first metal line and the second metal line on the base substrate are located within an orthographic projection of the second electrode strip on the base substrate.

3. The array substrate according to claim 1, wherein distances from the two sides of the data line in the row direction to a center of the pixel electrode in the row direction are equal to each other.

4. The array substrate according to claim 3, wherein the two sides of the data line in the row direction are located on within both sides of one of the second electrode strips in the row direction.

5. The array substrate according to claim 4, wherein the data lines and the second scan lines are provided on a same layer.

6. The array substrate according to claim 5, wherein a number of the common electrodes is less than a number of the pixel electrodes in each row.

7. The array substrate according to claim 6, wherein both sides of the second scan line in the row direction are located within two sides of one of the second electrode strips in the row direction.

8. The array substrate according to claim 6, further comprising:

a plurality of rows of first common signal lines, wherein the first common signal lines and the first scan lines are disposed on a same layer, and each row of the first common signal lines is located between two adjacent rows of the pixel electrodes, wherein one row of the first common signal lines and one row of the first scan lines are disposed between every two adjacent rows of the pixel electrodes, and each of the first common signal lines is electrically connected to the corresponding common electrode through a via hole structure.

9. The array substrate according to claim 8, further comprising:

one or more columns of second common signal lines, wherein the second common signal lines and the second scan lines are disposed on a same layer, each column of the second common signal lines is located between two adjacent columns of the pixel electrodes and is electrically connected to each row of the first common signal lines through a via hole structure, and both sides of the second common signal line in the row direction are located within both sides of one of the second electrode strips in the row direction, wherein a second common signal line has a common signal input terminal.

10. The array substrate according to claim 9, wherein a column of the second scan lines is provided between two adjacent columns of the pixel electrodes of one portion of the pixel electrodes, and a column of the second common signal lines is provided between two adjacent columns of the pixel electrodes of another portion of the pixel electrodes.

11. The array substrate according to claim 9, wherein a first metal line and a second metal line are located close to the second common signal line in the row direction.

12. The array substrate according to claim 9, wherein the second electrode strip of the common electrode corresponding to the data line, the second scan line or the second common signal line has a size in the row direction larger than that of the other second electrode strips in the row direction.

13. The array substrate according to claim 9, wherein the scan signal input terminal of the second scan line, the common signal input terminal of the second common signal line and the data signal input terminal of the data line are located on a same side of the base substrate.

14. The array substrate according to claim 1, wherein each row of the first scan lines is electrically connected to two or more columns of the second scan lines.

15. The array substrate according to claim 5, further comprising: a plurality of drive transistors, arranged in a form of array on the base substrate in the row direction and the column direction, wherein each of the drive transistors corresponds to one of the pixel electrodes, wherein the drive transistor comprises a gate electrode disposed on a same layer as the first scan line, an active layer located on a side of the gate electrode distal to the base substrate, and a source-drain electrode disposed on a same layer as the data line, a gate insulating layer is formed between the gate electrode and the active layer, wherein the gate insulating layer covers the gate electrode and the first scan line, a passivation layer is formed between the source-drain electrode and the pixel electrode, and the passivation layer covers the source-drain electrode, the data line and the second scan line, and the first scan line is electrically connected to the gate electrode, the data line is electrically connected to a source electrode in the source-drain electrode, and the pixel electrode is electrically connected to a drain electrode in the source-drain electrode via a via hole structure penetrating the passivation layer.

16. The array substrate according to claim 15, further comprising: an organic insulating layer, formed between the passivation layer and the pixel electrode, wherein the pixel electrode is electrically connected to the drain electrode via a via hole structure penetrating the organic insulating layer and the passivation layer.

17. The array substrate according to claim 16, further comprising: a color filter layer, formed between the passivation layer and the organic insulating layer, wherein the pixel electrode is electrically connected to the drain electrode via a via hole structure penetrating the organic insulating layer, the color filter layer and the passivation layer.

18. The array substrate according to claim 1, wherein the first electrode strips and the second electrode strips are in a bending shape, and the first electrode strips and the second electrode strips are bent with a bending angle of 150° to 170°.

19. The array substrate according to claim 17, wherein shapes the first metal line and the second metal line match a shape of the second electrode strip, and the first metal line and the second metal line are substantially parallel to the second electrode strip.

20. A display panel, comprising an array substrate, wherein the array substrate comprises:
- a base substrate;
- a plurality of pixel electrodes, arranged in a form of array on the base substrate in a row direction and a column direction, wherein each of the pixel electrodes has a plurality of first electrode strips disposed at intervals in the row direction, and a first conductive connection portion located on a same side of the plurality of first electrode strips and connected to the plurality of first electrode strips; and each of the pixel electrodes is comb-shaped as a whole;
- a plurality of common electrodes, disposed on a same layer as the pixel electrodes, wherein each of the common electrodes has a plurality of second electrode strips disposed at intervals in the row direction, and a second conductive connection portion located on a same side of the plurality of second electrode strips and connected to the plurality of second electrode strips; each of the common electrodes is comb-shaped as a whole; and the second electrode strips and the first electrode strips are alternatively arranged in the row direction;
- a plurality of rows of first scan lines, formed between the base substrate and the pixel electrodes, wherein each row of the first scan lines is located between two adjacent rows of the pixel electrodes;
- a plurality of columns of second scan lines, formed between the base substrate and the pixel electrodes, wherein each column of the second scan lines is located between two adjacent columns of the pixel electrodes and is electrically connected to the corresponding first scan line through a via hole structure, and a second scan line has a scan signal input terminal; and
- a plurality of columns of data lines, formed between the base substrate and the pixel electrodes, wherein each column of the data lines has a data signal input terminal, a data line is provided with respect to a center of a pixel electrode in the row direction, and a size of the data line in the row direction is small than a size of a second electrode strip located above the data line in the row direction;

wherein, the array substrate further comprises first metal lines and second metal lines, a first metal line and a second metal line are located close to at least one of the second scan line or the data line in the row direction.

* * * * *